Figure 1:
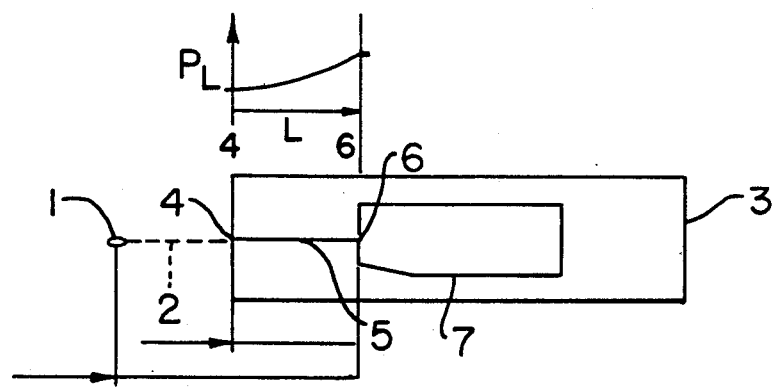

United States Patent [19]

Masicovetere et al.

[11] Patent Number: 5,220,146

[45] Date of Patent: Jun. 15, 1993

[54] METHOD FOR THE INITIAL CUTTING OF A WORKPIECE BY ELECTRICAL DISCHARGE CUTTING

[75] Inventors: Roland Masicovetere, Losone; Ivano Paganetti, San-Nazzaro; Mauro Erba, Locarno; Livio Mazzoline, Ponte Capriasca, all of Switzerland; Rino D'Amario, Taverne, Italy

[73] Assignee: AGIE A.G. fur industrielle Elektronik, Losone, Switzerland

[21] Appl. No.: 855,760

[22] Filed: Mar. 20, 1992

[30] Foreign Application Priority Data

Mar. 20, 1991 [DE] Fed. Rep. of Germany ....... 4109139

[51] Int. Cl.⁵ .................. B23H 7/02; B23H 7/20; B23H 7/04
[52] U.S. Cl. .................. 219/69.12; 219/69.17
[58] Field of Search ............... 219/69.12, 69.14, 69.17, 219/69.16, 69.13, 69.19; 364/474.04

[56] References Cited

U.S. PATENT DOCUMENTS

| | | | |
|---|---|---|---|
| 4,291,220 | 9/1981 | Lessmann et al. | 219/137 R |
| 4,868,760 | 9/1989 | Obara | 364/474.04 |
| 5,136,139 | 8/1992 | Gilliland | 219/130.21 |
| 5,185,507 | 2/1993 | Yasui | 219/69.12 |

FOREIGN PATENT DOCUMENTS

| | | | |
|---|---|---|---|
| 58-187262 | 11/1983 | Japan | 219/130.32 |
| 1-264718 | 10/1989 | Japan | 219/69.12 |
| 1181995 | 2/1970 | United Kingdom. | |

OTHER PUBLICATIONS

Patent Abstracts of Japan, vol. 11, No. 175, Jun. 1987 for Janpanese Patent Publication 62-6798.
Patent Abstracts of Japan, vol. 9, No. 245, Aug. 1985 for Japanese Patent Publication 60-99480.
Patent Abstracts of Japan, vol. A, No. 240, Nov. 1984 for Japanese Patent Publication 59-20368.
Ryabov et al, "Local Hardening of Components of Aluminium Alloys", *Welding International* 1988, No. 6, pp. 510–513.

*Primary Examiner*—Geoffrey S. Evans
*Attorney, Agent, or Firm*—Egli International

[57] ABSTRACT

A method for the initial cutting of a workpiece by electrical discharge cutting by a wire electrode, in which the values for the specific cutting parameters are reduced along an introduction path in the workpiece at least in part as compared with the values of the cutting parameters for the actual cutting contour, and at least some of the reduced values of the cutting parameters are continuously changed until the values intended for the actual cutting contour are reached.

13 Claims, 1 Drawing Sheet

METHOD FOR THE INITIAL CUTTING OF A WORKPIECE BY ELECTRICAL DISCHARGE CUTTING

The present invention relates to a method for the initial cutting of a workpiece by electrical discharge cutting by means of a wire electrode in which valves for the specific cutting parameters along an introduction path in the workpiece are reduced in part as compared with the values of the cutting parameters for the actual cutting contour.

Upon the initial cutting of a workpiece by means of a wire electrode, optimal cutting conditions do not initially prevail.

The reason for this is that, at the start of a gap which is to be cut, the wire electrode still does not find sufficiently stable conditions, particularly when not operating in the bath. In addition, the gap around the wire electrode is not yet symmetrical in such a manner that the wire electrode could be sufficiently loaded with power as though it were in the condition of the full cut. This, as well as further phenomena, particularly upon the initial cutting of a workpiece, are known. They lead to a very high probability of breaking the wire.

In order to prevent the wire electrode breaking already upon the initial cut, two measures have been proposed up to now in the prior art in order to counteract this problem. Both measures proceed from the fact that after the initial cutting of the workpiece the wire electrodes are guided initially with reduced power values along a so-called introduction path. This introduction path is then followed by the actual cutting contour. As from this point, the wire electrode is moved with full power.

In the case of the two measures mentioned above, during the movement of the wire electrode along the introduction path, the values for the cutting parameters were controlled as follows.

1. The flusing and power parameters were reduced to about 40% during the introduction path. This, to be sure, has the advantage that the probability of the breaking the wire is reduced, in view of the lesser stress of the wire electrode. At the same time, however, this type of movement, with substantially lower constant power than in the full cut along the introduction path, is very time-consuming. Reduced flushing and power parameters, namely, result in a lower speed of advance of the wire since, with less power, there is less removal in the workpiece than with greater power. This lower speed is tolerated here along the entire introduction path, even though the conditions for the wire are already substantially stabilized and higher values for the flushing and power parameters would be possible.

At the end of the introduction path, the values for the flushing and power parameters are finally increased by about 50% (?) in order to effect the full cut. This sudden increase in the values leads to a strong, rapid loading of the wire electrode and at the same time substantially increases the probability of the wire electrode breaking.

2. The introduction path is divided into individual sections. In this connection, the values of the aforementioned cutting parameters are, in each case, increased stepwise. Although the power steps are of course smaller than in the previously mentioned first measure, nevertheless excessively strong forces act on the wire electrode at the time of the stepwise loading. This second measure, furthermore, has the disadvantage that an increased expense for programming is necessary. At the same time, the measure is of general application, i.e. the cutting parameters must be redefined depending on length of introduction and related technology.

The object of the present invention is to reduce the danger of the wire breaking in the initial cutting phase.

This object is achieved with a method in which at least some of the reduced cutting parameters are continuously changed until the values intended for the actual cutting contour are reached. In this way, a sudden change in the values for the cutting parameters can be avoided. The wire is not irregularly loaded or for short periods of time excessively strongly loaded along the introduction path.

In one particularly preferred embodiment of the method of the invention, the values of the cutting parameters for the actual cutting contour are determined as end points for the continuous change, and the path for this change is determined at the start of the initial cutting (claim 2). After the end point has been reached, the contour cut is to be effected under the best possible conditions of power and flushing. In order to achieve the continuous transition without a sudden change in the values for the cutting parameters, the values of the cutting parameters are changed continuously in such a manner that a continuous transition into the cutting contour values is finally also present. The probability of the wire breakage is reduced to a minimum by this smooth transition of values.

At the same time, the length of the path, which is necessary for the introduction process, is fixed at the start of the initial cutting. This length is dependent on several limit conditions. For example, the height of the workpiece influences the length, insofar as in the case of higher workpieces the flushing is stabilized only later than in the case of lower workpieces. Furthermore, in the case of higher workpieces the wire feeds are further apart from each other than in the case of lower workpieces. Accordingly, in the case of higher workpieces the wire fluctuates more and its stabilization accordingly requires a longer period of time than in the case of lower workpieces. A longer path of introduction is therefore necessary with higher workpieces than in the case of lower workpieces. When determining the length of the introduction path, it is also necessary to consider whether the erosion process takes place in the bath or without a bath, how high the flushing pressure is, and what the course of the cut in the workpiece is to be, i.e. whether it is necessary to cut a subsequent geometry earlier or only at a later time. The different technological conditions must also be taken into account. In order to facilitate the work of the user, the values of the cutting parameters intended for the actual cutting contours as well as values for the determination of the introduction path are stored (claim 11). The user need then not determine, in a difficult and time-consuming manner, the values optimal for him. Rather, he has recourse to values, in particular for his specific workpiece, which have already been confirmed in practice. A particularly important step in the direction towards automation has been reached.

The values of the cutting parameters determined as end points at the beginning of the cutting can, to particular advantage, be changed in value as desired during the movement of the wire electrode along the introduction path (claim 3). With substantially improved conditions of automation, there is, at the same time, the possibility of the user intervening manually. If, for instance, the conditions in the gap have stabilized before the wire electrode has moved over the introduction path, the user, by manual intervention, can act on the values of the cutting parameters for the actual cutting contour and thus obtain them faster. The entire machining time is reduced.

The changing of the value of the cutting parameters as desired also has the following additional advantage. Namely, in the event that the wire electrode breaks in the introduction path, it is preferred first of all to move the wire electrode out of the workpiece and then move it back again to the place of breakage of the wire electrode in order then to move over the remaining path of introduction with reduced values as compared with the values at the time of the wire break (claim 10). At the place of a wire break, the load on the wire electrode is frequently too great. Upon manual intervention of the user at the place of the wire break, it can be avoided, by change of the values, that the entire introduction path has to be gone over again by the wire electrode. The initial values for the remaining path of introduction are reduced as from the place of the wire break in order to reduce the load on the wire electrode which was the decisive factor in the original breaking of the wire. After the restarting of the wire electrode from the point of the first wire break, the values of the reduced cutting parameters can be continuously changed by the same amount as was originally intended before the occurrence of the wire break. The probability of the wire electrode not breaking any longer is considerably increased. Of course, the values for the cutting parameters can also be reduced automatically, without manual intervention by the user.

In one particularly advantageous embodiment of the method of the invention, values of cutting parameters the changing of which does not result in any change in the gap are changed (claim 4). One such cutting parameter is, for instance, the frequency of the generator. Contrary to other cutting parameters, the increase or reduction of the frequency leads to a minimum change in, for instance, the width of the gap in the workpiece. In one particularly preferred development of the method, the cutting parameters are determined by generator values, in particular frequency, current intensity, voltage, pulse time and/or flushing values and particularly the flushing pressure, and/or wire-specific values, in particular wire characteristics and wire speed (claim 5). The cutting parameter values have the advantage that they can be changed manually or automatically in simple manner. Furthermore, their change can be immediately checked, so that the occurrence of errors is avoided.

Before the initial cutting of the workpiece, the wire electrode preferably passes over a well-defined starting path (claim 6). Among other things, it is thus possible to align the wire electrode with respect to the workpiece before the cutting starts. The wire preferably recognizes the place at which it arrives at the workpiece, and as from that place, begins continuously to change the values of the reduced cutting parameters in the direction towards the values intended for the actual cutting contour (claim 7). The recognition of the place as from which the wire electrode starts to cut the workpiece is preferably effected particularly via the voltage, the current, the flushing conditions or visually (claim 8). The initial cutting process is thereby further automated. Via the wire electrode, it is indicated when the continuous change in the values for the cutting parameters along the introduction path can commence.

In one particularly preferred embodiment of the method of the invention, the continuous change in the values of the reduced cutting parameters continues upon reaching the cutting contour path, provided that the values intended for the actual cutting contour are not yet reached (claim 9). By the extending of the introduction path into the cutting contour, introduction is therefore possible even if the required path for the introduction is greater than the introduction path itself.

Figure 2:
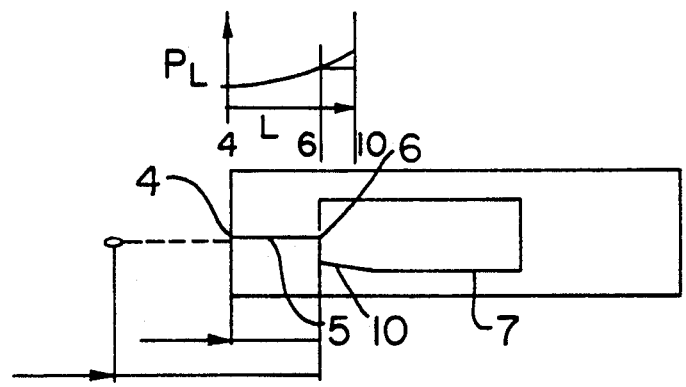
Figure 3:
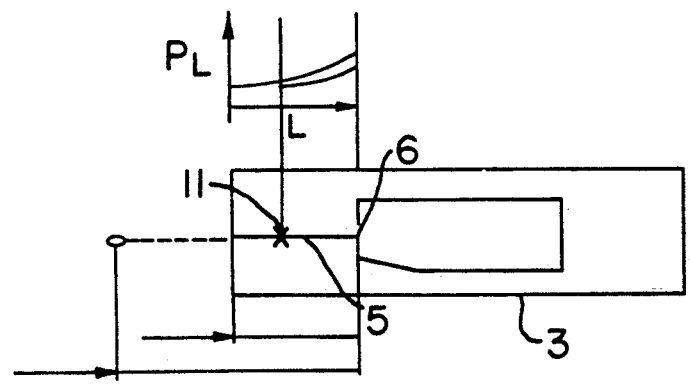

Embodiments of the invention are shown in the accompanying drawings and will be described in detail below. In the drawings:

FIG. 1 is a diagrammatic top view of cutting contours in a workpiece, the change shown in the values of the cutting parameters taking place along the introduction path;

FIG. 2 is a diagrammatic top view of cutting contours in the workpiece, the change in the values of the cutting parameters, also shown, taking place up into the cutting contour, and FIG. 3 is a diagrammatic top view of cutting contours in a workpiece in the event of a wire break, as well as the change in the values of the cutting parameters as from the wire break as compared with the customary continuous change of the values.

The invention will be explained on the basis of the construction and possibly the manner of operation of the invention shown in the drawing. In this connection, identical reference numerals are used for identical parts and sections in the figures.

FIG. 1 shows a starting point 1 for a wire electrode (not shown) upon electrical discharge machining. The wire electrode is first of all moved along a starting path 2 to a workpiece 3. By means which are not shown but are known, the electrical discharge machine recognizes when the wire electrode has reached the point of the starting cut 4 on the workpiece 3.

At this place 4, the cut cannot yet be effected with full power by the wire electrode. The reason for this, as already mentioned, is the asymmetrical geometry of the gap as well as stabilization processes of the wire electrode at the start of the erosion. If the wire electrode were acted on with full power, then the wire would break at the point of the starting cut 4. Accordingly, specific values of the cutting parameters, in particular concerning the generator and the flushing, must be substantially reduced at the point of the initial cut 4.

Adjoining the point of the initial cut 4, there is an introduction path 5. The wire electrode is advanced in this introduction path 5 with reduced power along the cutting gap. In this connection, the values of the cutting parameters specific for the cutting of the workpiece are continuously increased. After a distance of preferably 8 mm, which may be somewhat shortened or lengthened depending on the height of the workpiece and further limit conditions already discussed, the wire is acted on by values for the cutting parameters which correspond approximately to the values upon full cutting in the workpiece 3. The wire electrode has reached the start of the actual contour 7 at the end 6 of the introduction path 5. By continuous approach of the values for the cutting parameters to the predetermined end values upon the cutting of the cutting contour 7, breaks of the wire are avoided.

The continuous change of the power $P_L$ of the generator and/or of the flushing are shown as a function of the introduction length L in a diagram above FIG. 1. It can be noted therein that the curve for the change of the values in the diagram forms almost a ramp the length L of which in the embodiment of FIG. 1 agrees precisely with the length of the introduction path 5. If the introduction path is longer than said ramp, i.e. if the distance between the initial cut 4 and the end 6 of the introduction path is shorter than the length of the ramp, then the wire can travel with constant power $P_L$ along this remaining path until it has reached the start of the cutting contour 7. As from that point, the maximum possible power $P_L$ is applied in the full cut. The path of constant power can adjoin the start or the end of the ramp.

FIG. 2, on the other hand, shows the case in which the path for the introduction is smaller than the distance between the place of the initial cut 4 and the end of the introduction path 6. The introduction path 5 is, accordingly shorter than the ramp. As can be noted from the diagram shown above the diagrammatic top view of FIG. 2, the power $P_L$, at the end 6 of the introduction path, has not yet reached the optimal power in the full cut of the cutting contour 7. In order nevertheless to reach this maximum end power, the power of the aforementioned ramp is continuously changed further up into the cutting contour 7. The introduction process is thus completed at the end 10 of the introduction after a predetermined path for the introduction. The full cut then takes place under optimal power conditions adjoining said end 10.

The continuous increase in the power up into the cutting contour is necessary, in particular, in the case of so-called zig-zag cuts. In that case there are concerned, as is known, rectangular cut contours within which the wire can be acted on with full power after a short time. Due to the special contour, favorable conditions with respect to the gap can be expected in the case of zig-zag cutting after only a short path.

FIG. 3, finally, shows the introduction process of the invention upon the occurrence of a break of the wire at a point 11 along the introduction path 5 within the workpiece 3. If the wire has broken at the point 11, the wire electrode is moved back out of the gap which has been cut up to then. The values of the cutting parameters which have been reached up to that time and with which it was acted on upon the original ramp up to the appearance of the wire break are stored. After replacement of the wire electrode, it is returned to the point 11 of the orginal break of the wire. At this point 11, the stored power values are reduced somewhat in order to prevent further breakage taking place already upon starting up as a result of the load on the wire electrode. The continuous curve of the original ramp intended from the point 11 of the break of the wire up to the end 6 of the introduction path is further used by the wire insofar as the values of the cutting parameters are changed in the same manner along the remaining introduction path. Contrary to the introduction process prior to the break of the wire, the starting point for the remaining ramp in the power diagram is now, however, a reduced value of the cutting parameters at the point 11 of the break of the wire as compared with the original value at this point 11 at the time of the break of the wire. The probability of further breaks of the wire is thereby considerably reduced.

Of course, this strategy upon introduction into a workpiece can also be used upon the starting, proceeding from a starting hole drilled in a workpiece. Since, however, the conditions within the gap are stabler when a drilled starting hole is present, it is possible to shorten the length of the ramp.

We claim:
1. A method for initial cutting of a workpiece by electrical discharge using a wire electrode, comprising:
   determining values of cutting parameters for an actual cutting contour;
   determining an introduction path in the workpiece for the wire electrode;
   reducing values for specific cutting parameters along the introduction path in the workpiece, at least in part, as compared with the values of the cutting parameters for the actual cutting contour;
   continuously changing at least some of the reduced values of the cutting parameters as a function of the introduction path length until the values for the actual cutting contour are reached, the values of the cutting parameters for the actual cutting contour being end points for the continuous change; and
   determining a curve for the continuous change at a start of the initial cutting.
2. The method according to claim 1, wherein the values of the cutting parameters determined as end points at the start of the initial cutting can be changed in value as desired during the movement of the wire electrode along the introduction path.
3. The method according to claim 1, characterized by cutting parameters the change of the value of which results in a minimum change in the cutting gap.
4. The method according to claim 1, wherein the wire electrode passes over a well-defined starting path before the initial cutting of the workpiece.
5. The method according to claim 4, wherein the wire recognizes the place where it has arrived at the workpiece and, as from that place, starts continuously to change the values of the reduced cutting parameters in the direction towards the values intended for the actual cutting contour.
6. The method according to claim 5, wherein the recognition of the place from which the wire electrode initially cuts the workpiece is effected via one of voltage, current, flushing conditions and optically.
7. The method according to claim 1, wherein the continuous change in the values of the reduced cutting parameters continues upon reaching the cutting-contour path if the values intended for the actual cutting contour have not yet been reached.
8. The method according to claim 1, wherein in the event of the wire electrode breaking in the introduction path, the wire electrode is first of all moved out of the workpiece and then moved back again to the place of the break of the wire electrode, in order to move then over the remaining introduction path with reduced values as compared with the values at the time of the break of the wire.
9. The method according to claim 1, wherein the values of the cutting parameters intended for the actual cutting contour, as well as values for the determination of the introduction path, are stored.
10. The method according to claim 1, wherein the cutting parameters are determined by at least one of generator values, flushing values, and wire-specific values.
11. The method according to claim 10, wherein the wire-specific values include values representing particular characteristics of the wire, and wire speed.
12. The method according to claim 10, wherein the generator values include frequency, current intensity, voltage and pulse width.
13. The method according to claim 10, wherein the flushing values include the flushing pressure.

* * * * *